A. ALLISON & J. W. KEY.
PIPE TONGS.
APPLICATION FILED APR. 17, 1915.
1,175,400.
Patented Mar. 14, 1916.
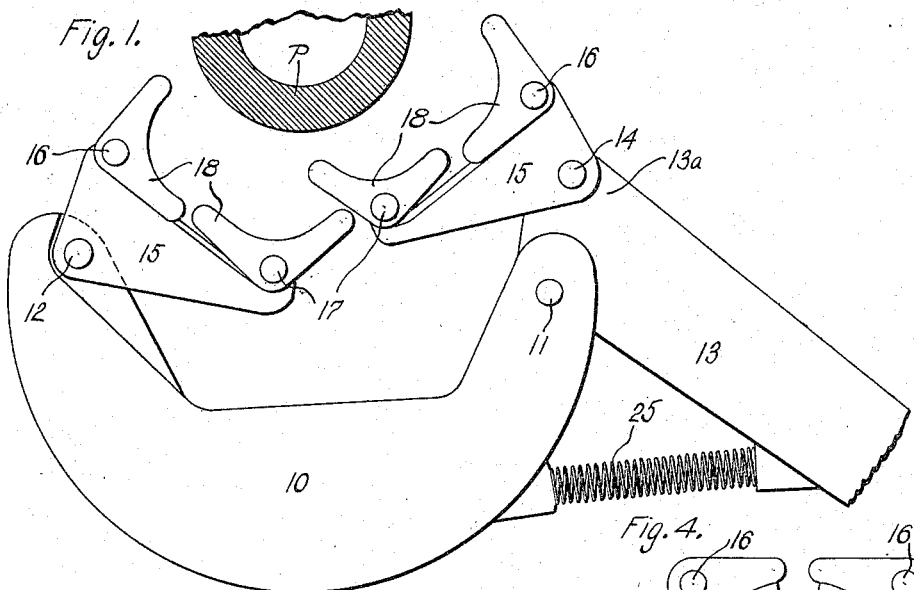
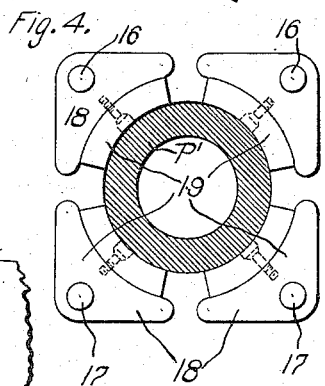
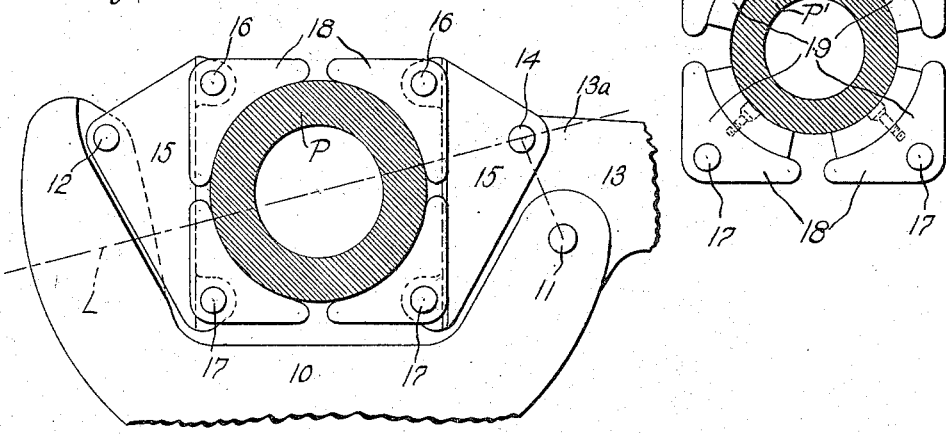
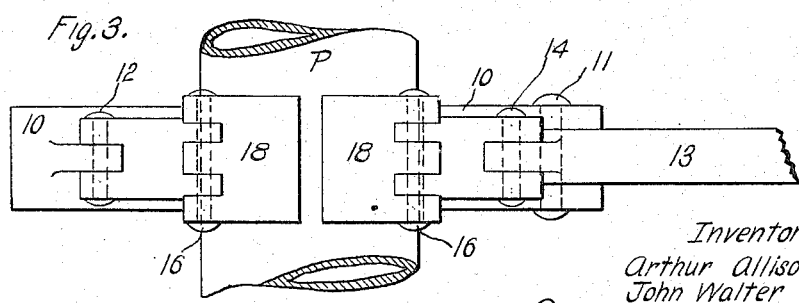
Witness.
Elwood H. Barkelew
Inventors.
Arthur Allison and
John Walter Key,
by James T. Barkelew
their Attorney.
THE COLUMBIA PLANOGRAPH CO., WASHINGTON, D. C.

UNITED STATES PATENT OFFICE.

ARTHUR ALLISON AND JOHN WALTER KEY, OF TAFT, CALIFORNIA.

PIPE-TONGS.

1,175,400. Specification of Letters Patent. Patented Mar. 14, 1916.

Application filed April 17, 1915. Serial No. 22,033.

*To all whom it may concern:*

Be it known that we, ARTHUR ALLISON and JOHN WALTER KEY, citizens of the United States, residing at Taft, in the county of Kern, State of California, have invented new and useful Improvements in Pipe-Tongs, of which the following is a specification.

This invention relates to improvements in pipe tongs, and particularly to tongs for exceptionally heavy work; and the invention consists primarily in certain provisions and constructions whereby we provide a tong capable of extremely heavy work and capable of obtaining a great purchase on the pipe without any possibility of deforming the pipe.

It is one of the particular features of this invention that the pipe gripping surfaces extend substantially completely around the pipe; so that, although great pressure can be brought to bear upon the pipe, said pressure is evenly distributed over the very large area completely around the pipe, so that the pipe cannot be deformed. There are various details of structure which we explain in the following specification, reference being had to the accompanying drawings, in which, for the purpose of this specification, we have illustrated a preferred and specific form of our invention; in which drawings—

Figure 1 is a plan of the tongs in open position, Fig. 2 is a plan showing the tongs closed about a pipe, Fig. 3 is an edge view of the tongs in the position shown in Fig. 2, and Fig. 4 is a view of the pipe gripping jaws, showing how bushings may be inserted for the purpose of adapting the tongs to pipe of different sizes.

In the drawings the numeral 10 designates a suitable yoke, preferably substantially semi-circular in configuration, said yoke carrying pivots 11 and 12 at opposite ends. It will be explained that these pivots are substantially opposite each other, and that the yoke extends substantially half way around the pipe P as shown in Fig. 2. The handle 13 is mounted upon the pivot 11 and has a lateral or transverse extension 13ᵃ which carries a pivot 14.

The pipe gripping jaws are pivoted at 12 and 14; and these pipe gripping jaws may be of various designs. The essential of each of the pipe gripping jaws is that it is pivoted at 12 or 14 and has a circular pipe engaging face of curvature corresponding to the curvature of the pipe to be gripped. In the drawings we show our preferred construction, of pipe gripping jaw, each jaw comprising a base member 15 carrying two pivots 16 and 17 upon which are mounted the pipe engaging members 18 as best shown in Figs. 2 and 3. These pipe engaging members 18 are free to assume any position about their pivots, so that they will fit down on the pipe surface closely and accurately. Their inner opposing surfaces are finished to a diameter and curvature corresponding to the size of pipe to be gripped; and it will be seen that when the tongs are closed about a pipe, the pipe gripping members 18 bear upon the pipe practically completely around it. The tongs may be adapted to pipe of various sizes by placing upon the inner curved surfaces of members 18, the bushings 19, adapting the tongs to a smaller size as shown at P' in Fig. 4.

When the tongs are in operative position about the pipe, it will be noted that the pivots 11 and 12 are substantially diametrically opposite each other. This need not be exactly true; but in our preferred construction it is substantially true. The exact relation of the pivots 11 and 12 is not of so very vital importance; but the relation of the pivots 12 and 14 is of very great importance. It is important that a line drawn through the pivots 12 and 14 will pass to one side of the center of the pipe, or the center of the gripping surfaces, that side being the one opposite the one on which the yoke 10 and the pivot 11 lies. Or, in other words, a line drawn as shown at L in Fig. 2, passing through the pivot 14 and the center of the pipe, must pass to one side of the pivot 12 as illustrated in Fig. 2. In other words, the yoke 10 and the extension 13ᵃ of the handle reach more than half way around the pipe. The distance between the pivots 11 and 14 measures the leverage or power of the tongs; and this distance may be varied to suit conditions.

Our tongs are made for exceptionally heavy pipe; and this leverage distance can consequently be designed so that a very heavy pressure can be put upon the pipe.

It will be noted that the pipe engaging members 18 adjust themselves when placed around the pipe, and that no latch is necessary with our tongs to hold the tongs in place around the pipe. One man can handle the tongs without a helper. A spring 25 may be used placed as shown in Fig. 1 to normally throw the yoke and handle apart, in a direction tending to close the jaws about the pipe; the effect of this spring being to hold the jaws lightly about the pipe on the back stroke of the tongs. The spring 25 is comparatively light, and means may be employed to vary its pressure if desired.

Having described a preferred form of our invention, we claim:

1. Pipe tongs, embodying a yoke, a handle pivotally connected to one end of the yoke to move in the plane of the yoke, and independently movable pipe gripping jaws pivoted one to the other end of the yoke and the other to said handle at a point offset from the pivotal connection of the handle to the yoke.

2. Pipe tongs, embodying a yoke, a handle pivotally connected to one end of the yoke to move in the plane of the yoke, and independently movable pipe gripping jaws pivoted one to the other end of the yoke and the other to said handle at a point offset from the pivotal connection of the handle to the yoke, the opposing faces of the two jaws being circularly shaped to fit around a pipe, and the angle subtended at the center of the pipe gripping surfaces by lines extending through the points of pivotal connection of the jaws with the yoke and handle respectively being greater than a straight line angle.

3. Pipe tongs, embodying a substantially semi-circular yoke, a handle pivoted directly thereto at one end, a jaw pivot carried by said handle transversely removed from the pivotal connection with the yoke, a pipe gripping jaw mounted on said jaw pivot, and another pipe gripping jaw pivotally mounted on the other end of the yoke, the opposing faces of the jaws being circularly shaped to fit around a pipe and the pivotal points at opposite ends of the yoke being substantially diametrically opposite each other.

4. Pipe tongs, embodying a substantially semi-circular yoke, a handle pivoted directly thereto at one end, a jaw pivot carried by said handle transversely removed from the pivotal connection with the yoke, a pipe gripping jaw mounted on said jaw pivot, and another pipe gripping jaw pivotally mounted on the other end of the yoke, the opposing faces of the jaws being circularly shaped to fit around a pipe and the pivotal points at opposite ends of the yoke being substantially diametrically opposite each other, and the line through the pivotal connections of the jaws with the handle and yoke, respectively, passing to the side of the center of the jaws opposite the side on which the semi-circular yoke lies.

5. Pipe tongs, embodying a yoke, a handle pivotally connected to one end of the yoke to move in the plane of the yoke, and pipe gripping jaws pivoted one to the other end of the yoke and the other to said handle at a point offset from the pivotal connection of the handle to the yoke, the opposing faces of the two jaws being circularly shaped around a pipe, and the angle subtended at the center of the pipe gripping surfaces by lines extending through the points of pivotal connection of the jaws with the yoke and handle respectively being greater than a straight line angle, said jaws each comprising a base member directly pivoted to the handle and yoke, respectively, and a pair of pipe engaging members pivoted to opposite ends of the base member.

6. Pipe tongs, embodying a substantially semi-circular yoke, a handle pivoted directly thereto at one end, a jaw pivot carried by said handle transversely removed from the pivotal connection with the yoke, a pipe gripping jaw mounted on said jaw pivot, and another pipe gripping jaw pivotally mounted on the other end of the yoke, the opposing faces of the jaws being circularly shaped to fit around a pipe and the pivotal points at opposite ends of the yoke being substantially diametrically opposite each other, and the line through the pivotal connections of the jaws with the handle and yoke, respectively, passing to the side of the center of the jaws opposite the side on which the semi-circular yoke lies, said jaws each comprising a base member directly pivoted to the handle and yoke, respectively, and a pair of pipe engaging members pivoted to opposite ends of the base member.

7. Pipe tongs, embodying a yoke, a handle pivotally connected to one end of the yoke to move in the plane thereof, two sets of pipe gripping jaws one pivoted to the other end of the yoke and the other pivoted to the handle at a point offset from the pivotal connection of the yoke to the handle, each set of jaws embodying a jaw member pivoted to the yoke or handle as aforesaid and a plurality of pipe engaging members each loosely pivoted to said jaw member and having curved pipe engaging surfaces adapted to fit around the pipe.

8. In a device of the character described, a frame, a pair of sets of pipe gripping jaws mounted thereon, each set embodying a jaw member pivoted to the frame and a plurality of pipe gripping members each pivoted to the jaw member and having curved pipe engaging faces, whereby the pipe engaging members may adjust themselves to fit closely around a pipe, substantially as described.

In witness that we claim the foregoing we have hereunto subscribed our names this 8th day of April 1915.

ARTHUR ALLISON.
JOHN WALTER KEY.

Witnesses:
SHERMAN A. FOX,
H. K. McCANN.